G. H. MOBLEY.
Bee-Hive.
No. 161,428.  Patented March 30, 1875.
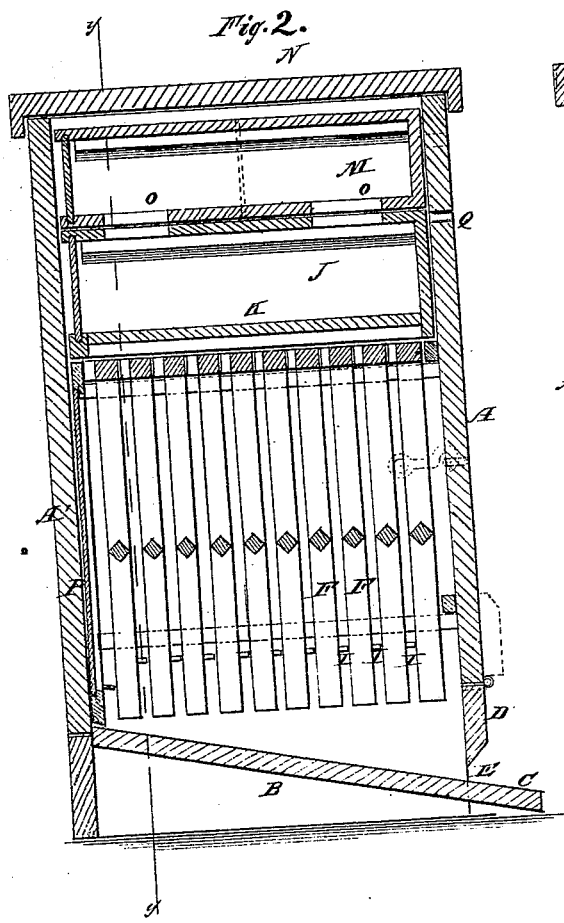
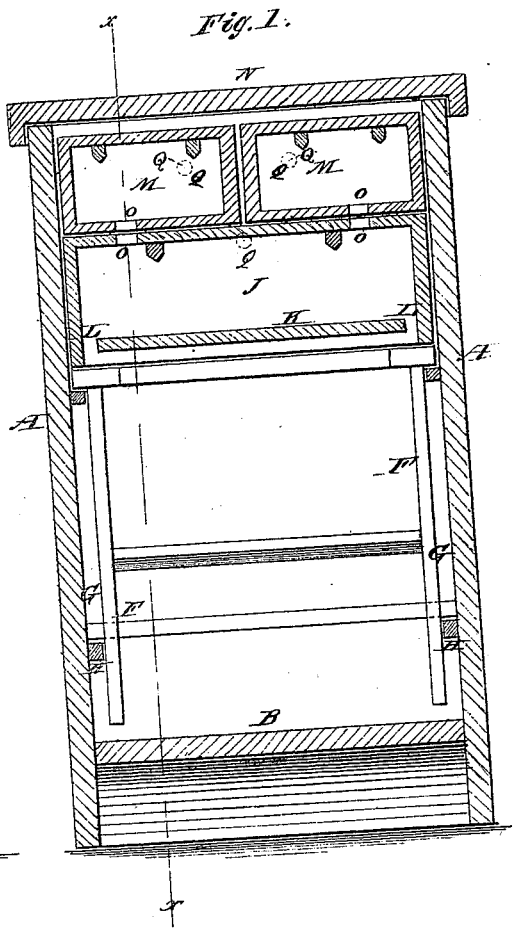

UNITED STATES PATENT OFFICE.

GEORGE H. MOBLEY, OF NEVADA, MISSOURI.

IMPROVEMENT IN BEE-HIVES.

Specification forming part of Letters Patent No. 161,428, dated March 30, 1875; application filed March 18, 1875.

*To all whom it may concern:*

Be it known that I, GEORGE H. MOBLEY, of Nevada, in the county of Vernon and State of Missouri, have invented a new and useful Improvement in Bee-Hives, of which the following is a specification:

The invention will first be fully described, and then clearly pointed out in the claim.

In the accompanying drawing, Figure 1 is a vertical section of Fig. 2, taken on the line $x\ x$. Fig. 2 is a vertical section of Fig. 1, taken on the line $y\ y$.

Similar letters of reference indicate corresponding parts.

A is the box or body of the hive, with the back A' hinged so as to open like a door and give access to the honey frames and boxes. B represents the bottom, which is inclined upward from the front, and projects in front, so as to form a lighting-board, C. By thus inclining the bottom or floor, the refuse matter and dead bees are readily removed. D is a flap-door, which is hinged to the front, as seen in Fig. 1, above the lighting-board. E is the bee-entrance. F represents the honey-frames, which are made with top rails projecting from the sides, so that they may be suspended from a cleat on each side of the hive, as represented in Fig. 2. G is a space on each side of the frames. The top rails of the frames are cut away, so that the bees have access to the honey-boxes between the frames. H H are cleats on the opposite sides of the hive for keeping the frames in place. There are wires or nails I in the lower part of the frames for keeping the frames a proper distance from each other. J is a honey-box, the superficial area of which is equal to the width of the hive. The bottom K of this box is raised, and it is narrower than the box, so that the bees can ascend and pass upward into the box through the openings L L. M represents honey-boxes, more or less in number, which rest on the box J. The bees pass from the box J to the boxes M through the openings O. P is a glass window, which closes in the frames, but allows them to be seen and inspected when the door A' is open. The outer ends of each of the boxes are glass, so that the boxes as well as the frames can be inspected when the hive is opened. N is the removable cap or top of the hive. Q are air-holes through the door and through the opposite side of the hive. By the arrangement shown a circulation of air is kept up through the entire hive. The entire top of the hive is inclosed by the cap, as seen in the drawing.

This is a simple, cheap, and easily-made bee-hive, all the parts are readily inspected or removed, and its advantages will be readily understood by all who are acquainted with bee-culture.

Having thus described my invention, I claim as new, and desire to secure by Letters Patent—

The honey-box J, having bottom K raised and narrower than the box to allow the bees to pass therein and up through the spaces L, as set forth.

GEO. H. MOBLEY.

Witnesses:
N. A. WIGHT,
JAS. W. SULLARDS.